United States Patent
Andrejko et al.

(10) Patent No.: US 10,318,591 B2
(45) Date of Patent: Jun. 11, 2019

(54) INGESTING DOCUMENTS USING MULTIPLE INGESTION PIPELINES

(71) Applicant: International Business Machines Corporation, Armonk, NY (US)

(72) Inventors: Pamela D. Andrejko, Cary, NC (US); Andrew R. Freed, Cary, NC (US); Cynthia M. Murch, Pine Island, MN (US); Jan M. Nordland, Hayfield, MN (US); Humberto R. Rivero, Fort Myers, FL (US)

(73) Assignee: International Business Machines Corporation, Armonk, NY (US)

( * ) Notice: Subject to any disclaimer, the term of this patent is extended or adjusted under 35 U.S.C. 154(b) by 787 days.

(21) Appl. No.: 14/728,050

(22) Filed: Jun. 2, 2015

(65) Prior Publication Data

US 2016/0359894 A1  Dec. 8, 2016

(51) Int. Cl.
*G06F 17/00* (2019.01)
*G06F 16/93* (2019.01)
(Continued)

(52) U.S. Cl.
CPC .......... *G06F 16/93* (2019.01); *G06F 16/3344* (2019.01); *G06F 17/241* (2013.01)

(58) Field of Classification Search
CPC ................. G06F 17/241; G06F 17/277; G06F 17/30011; G06F 17/271; G06F 17/30684; G06F 17/2715; G06F 17/30908
See application file for complete search history.

(56) References Cited

U.S. PATENT DOCUMENTS 7,165,024 B2   1/2007  Glover et al.
8,266,148 B2   9/2012  Guha et al.
(Continued)

FOREIGN PATENT DOCUMENTS

CN    102622510 A    8/2012
EP      1178408 B1   1/2009
(Continued)

OTHER PUBLICATIONS

Anonymous, "Corpus Ingestion Automation Using Domain Identification Given Domain Specific Lexicons," An IP.com Prior Art Database Technical Disclosure, IP.com No. 000229915, IP.com Electronic Publication: Aug. 6, 2013, http://null/IPCOM/000229915, 4 pgs.

(Continued)

*Primary Examiner* — Laurie A Ries
(74) *Attorney, Agent, or Firm* — Nicholas D. Bowman (57) ABSTRACT

A primary ingestion pipeline configured for use in natural language processing includes annotators configured for annotating documents. The annotators and documents to be annotated are evaluated. Based on the evaluations, an ingestion risk score is generated for each document. Each ingestion risk score represents a likelihood that an associated document will not successfully be annotated by the annotators. Each ingestion risk score is compared to a set of risk criteria. Based on the comparisons, a determination is made that each document of a first set of documents satisfies the set of risk criteria. A further determination is made, based on the comparisons, that each document of a second set of documents does not satisfy the set of risk criteria. In response to these determinations, the first set of documents is entered into the primary ingestion pipeline and the second set of documents is provided special handling.

20 Claims, 5 Drawing Sheets

(51) Int. Cl.
*G06F 17/24* (2006.01)
*G06F 16/33* (2019.01)

(56) References Cited

U.S. PATENT DOCUMENTS

| | | | |
|---|---|---|---|
| 8,296,724 B2 | 10/2012 | Lindley | |
| 8,510,340 B2 | 8/2013 | Carus et al. | |
| 8,549,353 B2 | 10/2013 | Thomson et al. | |
| 8,639,493 B2 | 1/2014 | Haug | |
| 8,712,758 B2* | 4/2014 | Crouch | G06F 17/2785 704/1 |
| 9,049,330 B2* | 6/2015 | Coles | H04N 1/00864 |
| 2005/0071807 A1 | 3/2005 | Yanavi | |
| 2007/0294584 A1 | 12/2007 | Jain et al. | |
| 2010/0095196 A1* | 4/2010 | Grabarnik | G06F 17/30705 715/230 |
| 2013/0096946 A1* | 4/2013 | Shah | G06Q 50/24 705/3 |
| 2013/0346409 A1* | 12/2013 | Welinder | G06F 17/30598 707/737 |
| 2014/0049801 A1* | 2/2014 | Coles | H04N 1/00864 358/403 |
| 2014/0082170 A1 | 3/2014 | Kaemmerer et al. | |
| 2014/0172417 A1 | 6/2014 | Monk, II et al. | |
| 2015/0066968 A1* | 3/2015 | Bastide | G06F 17/30386 707/758 |
| 2016/0055155 A1* | 2/2016 | Allen | G06F 17/3043 707/749 |
| 2016/0063001 A1* | 3/2016 | Scriffignano | G06F 17/2211 707/749 |
| 2016/0162456 A1* | 6/2016 | Munro | G06F 16/35 704/9 |
| 2016/0180242 A1* | 6/2016 | Byron | G06N 99/005 706/11 |
| 2018/0246897 A1* | 8/2018 | Lambert | G06F 16/338 |

FOREIGN PATENT DOCUMENTS

| | | |
|---|---|---|
| WO | 2000010100 A1 | 2/2000 |
| WO | 2000070482 A1 | 11/2000 |

OTHER PUBLICATIONS

Anonymous, "System and method for maintaining consistency in a continuous ingestion environment with different ingestion profiles," An IP.com Prior Art Database Technical Disclosure, IP.com No. 000236139, IP.com Electronic Publication: Apr. 8, 2014, http://null/IPCOM/000236139, 3 pgs.

Anonymous, "A Method to Identify and Report Each Failure on First Occurrence and Then Quarantine Each Failing Device During Device Test at Manufacturing," An IP.com Prior Art Database Technical Disclosure, IP.com No. 000214947, IP.com Electronic Publication: Feb. 15, 2012, http://null/IPCOM/000214947, 5 pgs.

Amancio et al., "Probing the Statistical Properties of Unknown Texts: Application to the Voynich Manuscript," published Jul. 2, 2013, DOI 10.1371/journal.pone.0067310, published Jul. 2, 2013, 13 pgs.

Anonymous, "Test Coverage of a natural language corpus", An IP.com Prior Art Database Technical Disclosure, IP.com No. IPCOM000236478D, IP.com Electronic Publication Date: Apr. 29, 2014, 3 pages.

* cited by examiner

| Annotator Name | Annotator Quality Indicator 1 Check | Annotator Quality Indicator 2 Check | Annotator Quality Indicator 3 Check | .... | Annotator Quality Indicator M Check | Annotator Risk Sub-score |
|---|---|---|---|---|---|---|
| Annotator 1 | 0.99 | 0.95 | 0.91 | | 0.92 | 0.93 |
| Annotator 2 | 0.78 | 0.73 | 0.75 | | 0.78 | 0.77 |
| ... | | | | | | |
| Annotator N | 0.88 | 0.89 | 0.87 | | 0.85 | 0.89 |

502

| Document Name | Document Quality Indicator 1 Check | Document Quality Indicator 2 Check | Document Quality Indicator 3 Check | .... | Document Quality Indicator O Check | Document Risk Sub-score |
|---|---|---|---|---|---|---|
| Document 1 | 0.67 | 0.69 | 0.62 | | 0.65 | 0.68 |
| Document 2 | 0.89 | 0.84 | 0.82 | | 0.88 | 0.86 |
| ... | | | | | | |
| Document P | 0.91 | 0.97 | 0.98 | | 0.95 | 0.98 |

INGESTING DOCUMENTS USING MULTIPLE INGESTION PIPELINES

BACKGROUND

The present disclosure relates to natural language processing and, more specifically, to ingesting documents using multiple ingestion pipelines with different configurations.

Natural language processing (NLP) is a field of computer science, artificial intelligence, and linguistics concerned with the interactions between computers and human languages. To interact with humans, natural-language computing systems may use a corpus of documents that are parsed and annotated. For example, the computing system may use the corpus to identify an answer to a question posed by a human user by correlating the question to the annotations of passages included in the documents of the corpus.

Before the NLP computing system is able to interact with a user, the corpus may be populated with different documents. In addition, annotators may parse the text in these documents to generate metadata about the text. Using the metadata and the text of the documents of the corpus, the NLP computing system can interact with the user to, for example, answer a posed question, evaluate financial investments, and the like.

SUMMARY

According to embodiments of the present disclosure, aspects of the disclosure may include a method, a system, and a computer program product for analyzing a primary ingestion pipeline configured for use in natural language processing (NLP). The primary ingestion pipeline includes a plurality of annotators configured for annotating documents passing through the primary ingestion pipeline. The plurality of annotators are evaluated. A plurality of documents to be annotated by the plurality of annotators are also evaluated. Based on the evaluations of the plurality of annotators and the plurality of documents, an ingestion risk score is generated for each document of the plurality of documents. Each ingestion risk score represents a likelihood that an associated document will not successfully be annotated by the plurality of annotators while passing through the primary ingestion pipeline. Each ingestion risk score is compared to a set of risk criteria. Based on the comparisons, a determination is made that each document of a first set of documents of the plurality of documents satisfies the set of risk criteria. A further determination is made, based on the comparisons, that each document of a second set of documents of the plurality of documents does not satisfy the set of risk criteria. In response to these determinations, the first set of documents is entered into the primary ingestion pipeline and the second set of documents is provided special handling.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to natural language processing and, more specifically, to ingesting documents using multiple ingestion pipelines with different configurations. While the present disclosure is not necessarily limited to such applications, various aspects of the disclosure may be appreciated through a discussion of various examples using this context.

During natural language processing, documents may be ingested using an ingestion pipeline. As used herein, an ingestion pipeline may include a set of (e.g., one or more) annotators that process documents. As used herein, annotators may refer to computing elements designed to search through documents and analyze the documents' text portions using a defined set of tags. A document that is processed by one or more annotators may be deemed annotated once it has been tagged with the appropriate tags (e.g., annotations) used by each annotator. There are many different types of annotators that may be used together or separately. Examples of annotators may include, for example, part-of-speech taggers (for annotating the part-of-speech of words or phrases within a document), semantic relationship identifiers (for tagging semantic links between words or phrases in a document), and syntactic relationship identifiers (for tagging syntactic links between words or phrases in a document).

Annotators may be simple or complex. In some embodiments, certain annotators may be second-stage annotators that rely on earlier annotations by other annotators as their inputs. For example, consider an ingestion pipeline that might be used in a medical setting. This example pipeline includes, among other annotators, a first annotator that tags references to natural persons (e.g., using a program code that detects certain proper nouns, pronouns, and keywords (like "patient") within the text) and a second annotator that tags references to specific medications (e.g., using a pharmacological dictionary). In this example, a third annotator of the pipeline could be a person-medication linker annotator that links together the natural person tags from the first annotator and the medication name tags from the second annotator.

In some embodiments, a group of annotators may be classified together into a group of similar or related annotators called aggregates. For example, there might be an oncology aggregate that includes a group of annotators that have special applicability for oncology. In some embodiments, rather than evaluating or otherwise considering individual annotators, annotators may be considered only as aggregates. This may result in a lesser degree of granularity, with more generality, and may allow for faster analysis of an entire set of annotators in an ingestion pipeline.

During document ingestion, any number of documents (including, e.g., thousands or even millions of documents) may be processed by an ingestion pipeline containing any number of annotators. In some situations, the majority of the documents pass through the ingestion pipeline and are annotated by annotators without problems. A few of the documents, however, may get caught on an annotator in the ingestion pipeline. This can cause this ingestion pipeline to crash or end up in an infinite loop from which it cannot break out. This can result in significant amount of lost time, as the ingestion pipeline may need to be fixed and restarted. Furthermore, it may be difficult in some situations to even determine which particular document of a group being processed actually caused the crash. Without a burdensome amount of instrumentation, a search for the offending document may take a significant amount of time and resources. And even when an offending document is located, it can take even more time to program the ingestion pipeline to ignore (e.g., not ingest or only partially ingest) that particular document.

One potential solution to this issue of a small number of failing documents is to modify the configuration of the ingestion pipeline. For example, there could be an increase to the amount of logging (e.g., more tracing, a greater degree of instrumentation) in the ingestion pipeline for debugging purposes. By using higher log levels, or other forms of increased debugging, it may be easier to locate and fix errors or irregularities that occur during document ingestion. Also, troublesome documents may be processed by the same annotator several times and in several different ways (e.g., as a whole document, then on a per page level, then on a paragraph level, etc.) until the document is successfully annotated.

These potential solutions, may, however, create certain problems of their own. For example, by increasing debugging in an ingestion pipeline, the ingestion pipeline may run slower. Also, even a small of amount of increased logging per document could mean a significant increase in log size, which may itself take up a significant amount of resources to manage. Overall, the increased benefits of configurations with more intensive analysis per document may be outweighed by the increased costs of these configurations. This may be particularly true when the majority of documents (in some situations even the vast majority) pass through the ingestion pipeline without problems.

In some embodiments of the present disclosure, annotators of an ingestion pipeline as well as the documents to be ingested by the pipeline may be evaluated. This evaluation information may then be used to determine, before a failure actually occurs, whether a document is at a high risk for failing to be ingested. In other words, the evaluation information may be used to predict failures before they happen, so that they can be prevented. More specifically, based on these evaluations, ingestion risk scores may be generated that represent the likelihood that associated documents will successfully pass through the ingestion pipeline. These risk scores may then be compared to a set of criteria. Documents associated with ingestion risk scores that satisfy the set of criteria may be entered into the ingestion pipeline and processed in the normal fashion by the set of annotators. Documents associated with ingestion risk scores that fail the set of criteria may be singled out for special handling. In some embodiments, this special handling may include being processed by a secondary ingestion pipeline that has the same set of annotators but a different configuration (e.g., higher logging levels) than the main (primary) ingestion pipeline. This may allow for more efficient debugging, with more resources being dedicated to analyzing the processing of documents that are more likely to be problematic.

Furthermore in some embodiments, as part of the evaluation of an ingestion pipeline, characteristics of documents and/or annotators that are likely to cause pipeline failures may be identified. Documents and annotators having these troublesome characteristics may then be discovered and isolated from other documents (and, potentially, annotators) that are not as problematic. The non-problematic documents may then be processed quickly, while special handling is applied to the troublesome documents. In some embodiments, this special processing may take the form of separating risky documents away from a main ingestion pipeline to help ensure that they do not crash (e.g., hang) the main ingestion pipeline. This may allow the low-risk documents to be processed more efficiently. In some embodiments, determining which documents to separate out may not require precise knowledge of which document will fail, but rather just a prediction as to which documents are at higher risk for failure. Ultimately, in some embodiments, even if some documents of the group (e.g., of the batch) cannot be processed, they can be discovered and set aside before they cause major problems for processing the remainder of the documents in the group.

Figure 1:
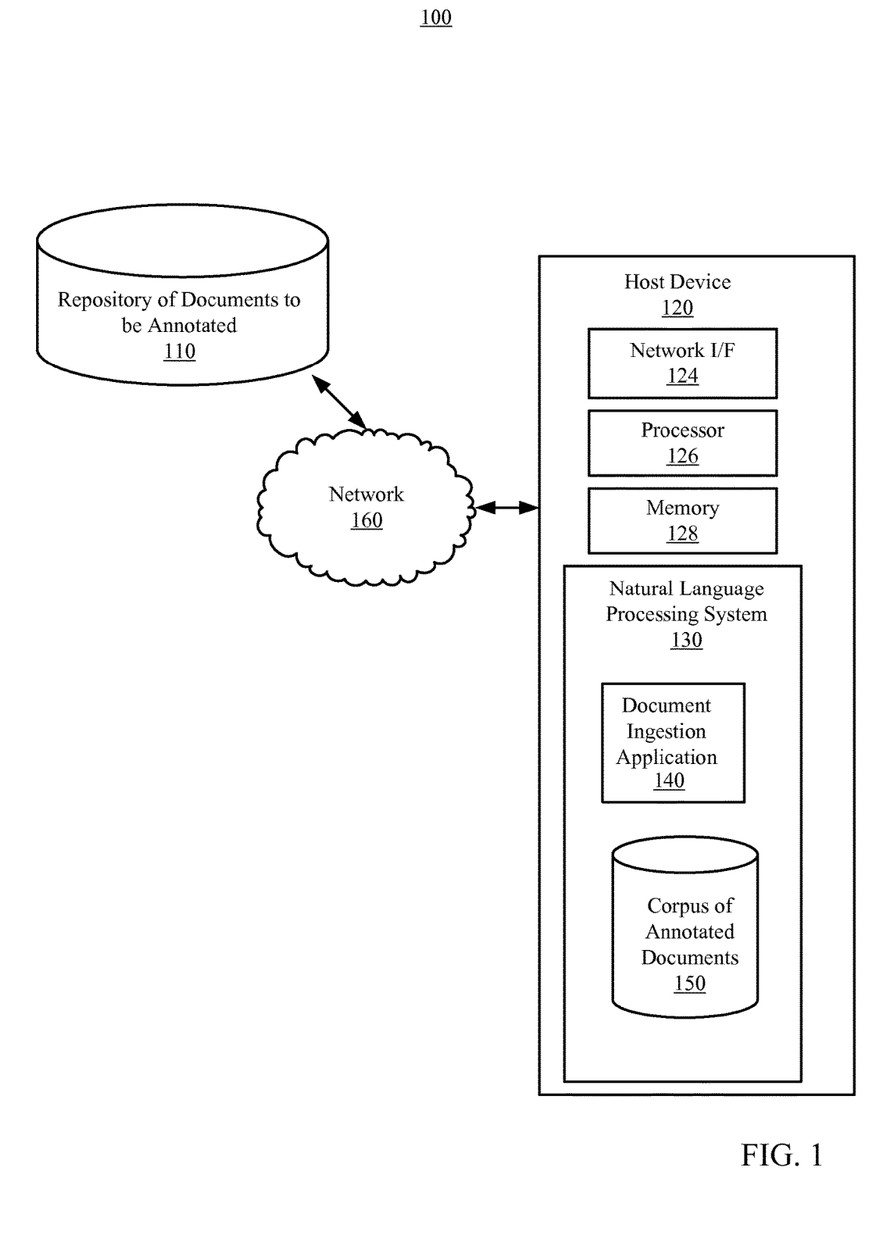
FIG. 1 illustrates a block diagram of an example computing environment for use with a natural language processing system, in accordance with embodiments of the present disclosure.

As discussed above, aspects of the disclosure may relate to document ingestion for natural language processing. Accordingly, an understanding of the embodiments of the present invention may be aided by describing embodiments of natural language processing systems and the environments in which these systems may operate. Referring now to the figures, shown in FIG. 1 is a block diagram of an example computing environment 100 for use with a natural language processing system, in accordance with embodiments of the present disclosure. In some embodiments, the computing environment 100 may include one or more repositories 110 of documents to be annotated and one or more host devices 120. Repository 110 and host device 120 may be distant from each other and communicate over a network 160 in which the host device 120 comprises a central hub from which repository 110 may establish a communication connection. Alternatively, the host device 120 and repository 110 may be configured in any other suitable relationship (e.g., in a peer-to-peer or other relationship).

In some embodiments, the network 160 may be implemented by any number of any suitable communications media (e.g., wide area network (WAN), local area network (LAN), Internet, Intranet). Alternatively, repository 110 and host device 120 may be local to each other, and communicate via any appropriate local communication medium (e.g., local area network (LAN), hardwire, wireless link, Intranet). In some embodiments, the network 160 may be implemented within a cloud computing environment, or using one or more cloud computing services. Consistent with various embodiments, a cloud computing environment may include a network-based, distributed data processing system that provides one or more cloud computing services. Further, a cloud computing environment may include any number of computers (e.g., hundreds or thousands of them or more), disposed within one or more data centers and configured to share resources over the network 160.

In some embodiments, host device 120 may include a natural language processing system 130 having a document ingestion application 140 and a corpus of annotated documents 150. The natural language processing system 130 may be configured to answer queries received from users by parsing the queries, intelligently searching within the corpus of annotated documents 150, and providing the users with responses based on the search results. In order to have annotated documents that the natural language processing system 130 can search, the document ingestion application 140 may be used to ingest documents and annotate them during the ingestion process.

Consistent with various embodiments, host device 120 (and potentially repository 110) may be a computer system, and may be equipped with a display or monitor. The computer system may include at least one processor 126; memory 128; internal or external network interface or communications device 124 (e.g., modem, network interface cards); optional input device (e.g., a keyboard, mouse, touchscreen, or other input device); and any commercially available or custom software (e.g., browser software, communications software, server software, natural language processing software, search engine and/or web crawling software). In some embodiments, the computer system may include servers, desktops, laptops, and hand-held devices.

Figure 2:
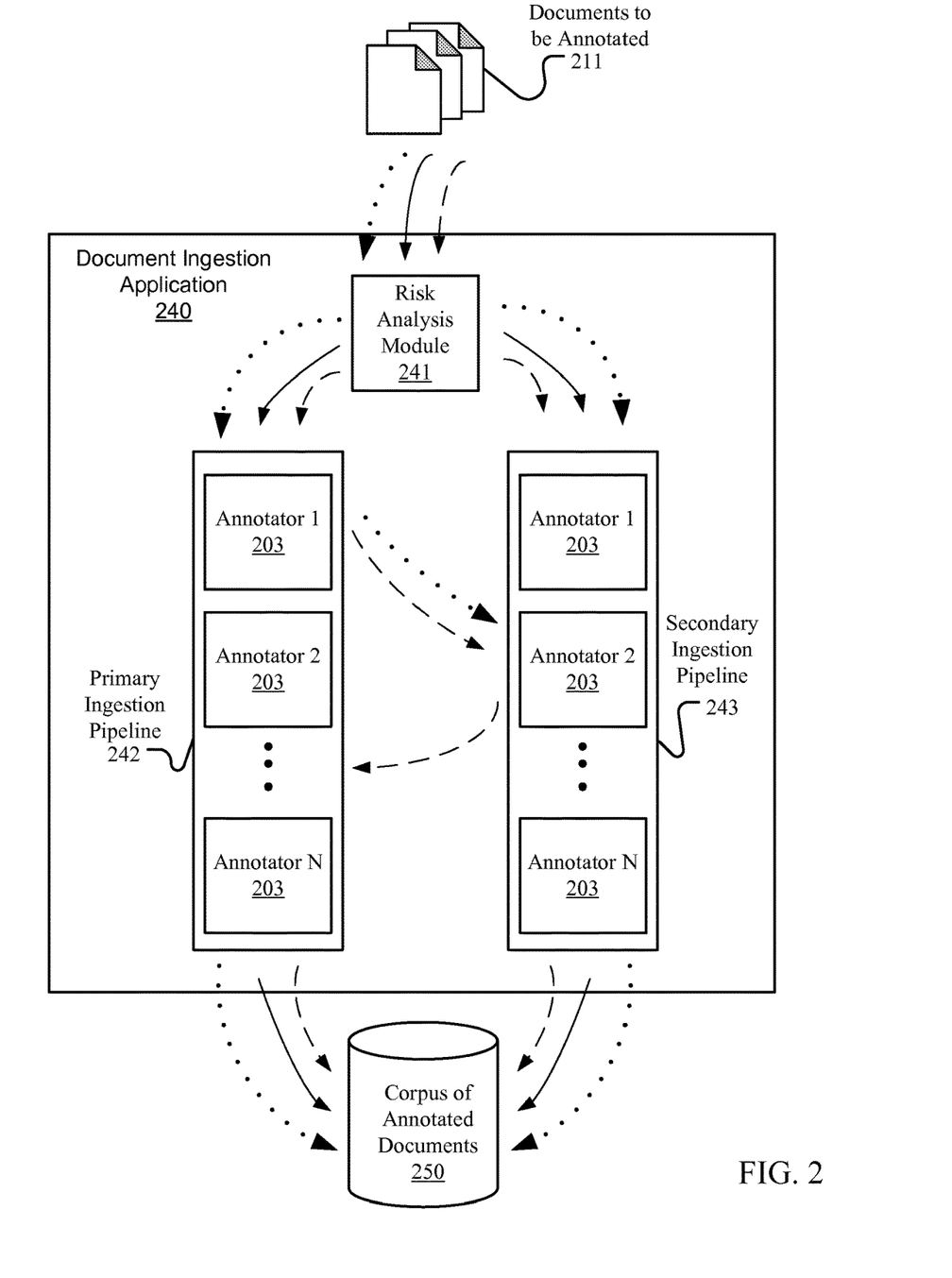
FIG. 2 illustrates a block diagram of an example document ingestion application configured to ingest documents for use by a natural language processing system, in accordance with embodiments of the present disclosure.

Referring now to FIG. 2, shown is a block diagram of an example document ingestion application 240 configured to ingest documents 211 for use by a natural language processing system, in accordance with embodiments of the present disclosure. In some embodiments, document ingestion application 240 may be the same or substantially similar to document ingestion application 140 of FIG. 1. As shown, document ingestion application 240 includes a risk analysis module 241, a primary ingestion pipeline 242, and a secondary ingestion pipeline 243. The risk analysis module 241 may be configured to analyze incoming documents 211 to be ingested in order to determine whether the document should be ingested normally (e.g., via the primary ingestion pipeline 242) or whether the document should be provided special handling (e.g., ingestion via the secondary ingestion pipeline 243).

As shown, the primary ingestion pipeline 242 includes a plurality of annotators 203 beginning with annotator 1, then annotator 2, and ending at annotator N, where N may represent any annotator number. Within the primary ingestion pipeline 242, documents 211 may or may not be processed by the annotators 203 in order. Further, in some embodiments, not all annotators 203 may be used on every document 211.

As shown, the secondary ingestion pipeline 243 includes the same set of annotators 203 (e.g., annotator 1 to annotator N) as are included in the primary ingestion pipeline 242. This may not always be the case, however, as in some embodiments the set of annotators 203 in the primary ingestion pipeline 242 may not completely overlap with the set of annotators 203 in the secondary ingestion pipeline 243.

In some embodiments, the configuration settings for the primary ingestion pipeline 242 may be different than for the secondary ingestion pipeline 243. For example, the configuration settings for the primary ingestion pipeline 242 may include lower log level settings, shorter timeouts, or lower levels of recursion than are found in the secondary ingestion pipeline 243. Overall, the configuration of the primary ingestion pipeline 242 may be designed to allow for less debugging analysis per document 211 than the secondary ingestion pipeline 243. For example, lower log level settings may mean that there is less logging of the execution of the program code of the annotators 203 in the primary ingestion pipeline 242 than there is in the same annotators 203 in the secondary ingestion pipeline 243 while documents 211 are passing through the respective annotators. For another example, shorter timeouts in the primary ingestion pipeline 242 may mean that the processing of a particular document 211 by a particular annotator 203 is only given a relatively short amount of time to complete before the process times out and the particular document 211 is transferred out of the primary ingestion pipeline 242. This may help to keep a relatively fast pace of processing in the primary ingestion pipeline 242.

Also shown is a corpus of annotated documents 250. The corpus 250 may be configured to store documents after the ingestion process is complete. These documents may then be used for question-answering or other purposes. In some embodiments, corpus 250 may be the same or substantially similar to corpus 150 of FIG. 1.

In use, prior to document 211 ingestion, the risk analysis module 241 may be used to evaluate each of the annotators 203. Examples of methods for evaluating annotators are described herein. Then, in some embodiments, there may be multiple different ways that the document ingestion application 240 may operate on documents 211. In a first example, as shown by the solid path lines in FIG. 2, the documents 211 may be received by the risk analysis module 241. The risk analysis module may evaluate each individual document 211 as it is received. Examples of methods for evaluating documents are described herein. Based on the analysis of a particular document 211 and the prior analyses of the annotators 203, a determination may be made as to whether the document is likely to successfully pass through the set of annotators 1 to N. As shown by the continued paths of the solid lines in FIG. 2, documents 211 that are deemed likely to successfully pass through the set of annotators 203 are entered into primary ingestion pipeline 242 and documents 211 that are deemed unlikely to successfully pass through the set of annotators 203 are entered into the secondary ingestion pipeline 243. Once entered into an appropriate pipeline, each document 211 is processed (e.g., annotated) by the annotators 203 and then stored in the corpus 250.

In some embodiments, this use of a primary ingestion pipeline 242 along with a secondary ingestion pipeline 243 may help to ensure that low-risk documents are processed quickly and most of the resources may be dedicated to processing those documents that are likely to succeed at ingestion. The problem documents, while perhaps receiving more resource-intensive ingestion per document, may overall take up less of the ingestion resources than the low-risk documents.

A first example variant on the above-described way of operating the document ingestion application 240 is shown by the dotted path lines in FIG. 2. In this first variant, individual documents 211 that fail some sort of threshold (e.g., timing out on a particular annotator 203) during processing in the primary ingestion pipeline 242 are then transferred to the secondary ingestion pipeline 243 for processing by the remainder of the annotators 203. This embodiment may allow for some degree of latitude in making the initial determination as to whether a particular document 211 will successfully pass through the set of annotators 203. More particularly, the ability to transfer a document 211 to the secondary pipeline 243 is a remedy in the event that the document 211 fails to pass through the primary ingestion pipeline 242, despite the initial determination to the contrary.

A second example variant on the above described way of operating the document ingestion application 240 is shown by the dashed path lines in FIG. 2. In this second variant, the risk analysis module 241 may take a more granular approach to evaluating each document 211. More specifically, in addition to making the determination as to whether a given document is likely to successfully pass through the entire set of annotators 203, the risk analysis module 241 may also make individual risk determinations as to the riskiness of passing a particular document 211 through a particular annotator 203 (rather than the entire set of annotators 203). Based on the analyses, and as shown by the continued paths of the dashed lines in FIG. 2, the risk analysis module may determine whether a particular document 211 should be processed entirely by the primary pipeline 242, entirely by the secondary pipeline 243, or partially by both pipelines 242 and 243. Documents 211 that are to be processed entirely by the secondary ingestion pipeline 243 are entered into the secondary ingestion pipeline 243, annotated by the annotators 203 therein, and then stored in the corpus 250. Similarly, documents 211 that are to be processed entirely by the primary ingestion pipeline 242 are entered into the primary ingestion pipeline 242, annotated by the annotators 203 therein, and then stored in the corpus 250.

To continue this second variant, for each of the third set of documents 211 (e.g., those to be processed partially in both pipelines), a determination may be made by the risk analysis module 211 as to whether there are any annotators 203 that are likely to pose a high failure risk (e.g., for timing out or even crashing the primary ingestion pipeline 242) for a particular document 211. For each such annotator 203, that particular document 211 may be transferred over to the secondary ingestion pipeline 243 and then transferred back to the primary pipeline 242 after processing by the high risk annotator 203 in the secondary pipeline 243. A more specific example is shown by the dashed path lines in FIG. 2, wherein a particular document is considered high risk for processing by annotator 2, and, therefore, after being annotated by annotator 1 in the primary ingestion pipeline 242 is transferred to annotator 2 of the secondary ingestion pipeline 243, processed by that annotator, and then transferred back to the primary ingestion pipeline 242 for processing by the remaining annotators 203 and then stored in the corpus 250.

While the document ingestion application 240 is shown as including two ingestion pipelines, it is contemplated that, in some embodiments, three or more ingestion pipelines may be included. In some embodiments with, for example, three ingestion pipelines, the risk analysis module 241 may be used to determine whether a document 211 is low-risk (and to be sent to a primary ingestion pipeline 242), medium-risk (and to be sent to a secondary ingestion pipeline 243), or high-risk (and to be sent to a tertiary ingestion pipeline (not shown)). Each of the three ingestion pipelines may have different configurations. For example, the tertiary pipeline may have the most logging and longest time-outs, thus allowing the riskiest documents 211 to receive the most resources per document.

Furthermore, in some embodiments having two or more ingestion pipelines, the set of criteria used to determine which ingestion pipeline each document 211 is entered into may include an assessment of the number of high-risk characteristics found in each document 211. For example, a risk analysis module 241 may be configured to search each document to see whether it has one or more of characteristics that are predetermined to be high-risk characteristics (e.g., characteristics that substantially increase the likelihood that the document will not successfully pass through an ingestion pipeline). In such a situation, the ingestion pipeline into which a particular document is entered into may depend on the number of high-risk characteristics that it possesses. For example, in document ingestion application 240 having three ingestion pipelines and a risk analysis module 241 configured to recognize six different high-risk characteristics, documents 211 that have between zero and two, inclusive, of the characteristics may be entered into a primary ingestion pipeline 242, documents 211 that have between three and four, inclusive, of the characteristics may be entered into a secondary ingestion pipeline 243, and documents 211 that have between five and six, inclusive, of the characteristics may be entered into a tertiary ingestion pipeline (not shown). Furthermore, to continue the example, documents 211 may be transferred among the three ingestion pipelines if it is determined during processing that they are in fact higher (or lower) risk than was initially predicted by the risk analysis module 241. Ultimately, the highest-risk or most troublesome documents may be removed from the ingestion pipelines altogether and placed in a quarantine for later individual analysis.

Figure 3:
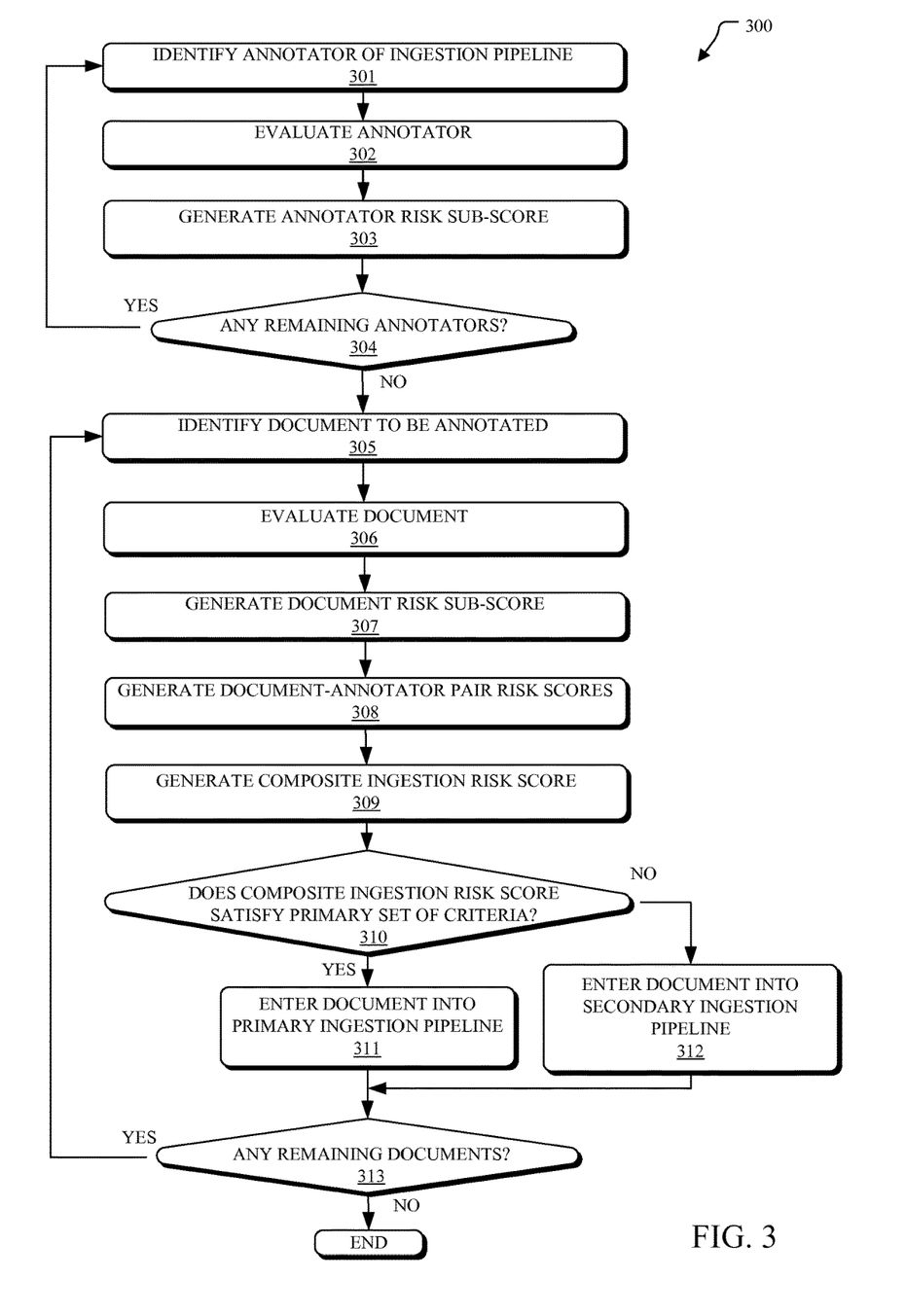
FIG. 3 illustrates a flowchart of an example method for managing document ingestion in a natural language processing system, in accordance with embodiments of the present disclosure.

Referring now to FIG. 3, shown is a flowchart of an example method 300 for managing document ingestion in a natural language processing system, in accordance with embodiments of the present disclosure. In some embodiments, one or more operations of the method 300 may be performed by the document ingestion application 240 of FIG. 2. The method 300 may begin at operation 301 with an annotator of a primary ingestion pipeline being identified. Per operation 302, the annotator is evaluated. In some embodiments, the purpose of the evaluation may be to determine the quality of the annotator. Per operation 303, an annotator risk sub-score is generated for the annotator based on the evaluation of the annotator. In some embodiments, the risk sub-score may be a general measure of the quality of the annotator. In some embodiments, the annotator risk sub-score may be a measure of how likely the annotator is to cause the primary pipeline to crash or otherwise fail during document ingestion. The annotator risk sub-score may be measured based on any applicable ranking or sorting scale. Per operation 304, a determination is made as to whether there are any remaining annotators in the primary ingestion pipeline that have yet to be scored. For each such remaining annotator, operations 301-303 are performed.

In some embodiments, additional evaluations of the annotators may occur. These additional evaluations may involve creating models of test cases (e.g., sets of test documents) that are designed to have various characteristics that are likely to cause problems for annotators. These test cases may then be processed by the annotators of the ingestion pipeline while the process is being closely monitored. The purpose of using these test cases may be to make difficult situations that test the limits of the annotators under test. After running the test cases, the results of the runs may be analyzed in order to figure out which areas of the pipeline are likely to be problematic (e.g., which annotators are likely to crash the pipeline when faced with certain types of documents). Ultimately, the annotator risk sub-scores may be based, at least in part, on these test results. Other annotator evaluation tools that may also be considered include, for example, defect logs and stack trace records.

Further, in some embodiments, annotators may be evaluated based on records collected from past uses of the annotators in other ingestion pipelines. For example, every time a particular annotator is used in an ingestion pipeline, information about the functioning of the annotator may be recorded in a central repository. The central repository may then be used to track statistics about the functioning of that annotator. Then, in some embodiments of operation 302, the statistics may be analyzed as part of the evaluation of that annotator. This could include, for example, evaluating the annotator as being of a lower quality if it has a history of crashing more than ten-percent of the ingestion pipelines in which it has previously been used.

Furthermore, in some embodiments, each annotator of an ingestion pipeline may be evaluated based on an analysis by a software tool designed to check the source code of annotators for defects (or signs of likely defects) that are likely to make annotators more risky to use. For example, a software tool could be used to check for access violations, uninitialized variable references, excessive recursions, etc. Annotators that are found to have more code defects could be considered higher risk.

Once all of the applicable annotators have been scored, then, per operation 305, a document to be annotated is identified. This document may be, for example, a first document in a large set of documents to be annotated by the document ingestion application. Per operation 306, the document is evaluated. The purpose of the document evaluation may be to determine how likely the particular document is to cause a problem during processing by the primary ingestion pipeline. Any applicable factors may be evaluated. These factors may include, for example, the complexity of the document (e.g., with a more complex document being more likely to cause problems during ingestion), and whether the document has failed in the past and how recently the failure occurred. Per operation 307, a document risk sub-score may be generated for the document based on the evaluation of the document. The document risk sub-score may be a general measure of the likelihood that the document will cause problems in one or more annotators of the primary ingestion pipeline.

In some embodiments, evaluations of documents may include using a document analysis software tool to analyze a document before it is ingested. Such a software tool could determine a variety of values, for example, the number of words in the document, the length of the document (in pages), the average length of the words in the document. These values could then be used in evaluating the document with, for example, a document having more than a threshold number of words being deemed more likely to crash the ingestion pipeline.

Further, in some embodiments, documents may be evaluated based on records collected from past annotations of the documents in other ingestion pipelines. For example, every time a particular document is annotated in an ingestion pipeline, information about the document may be recorded in a central repository. The central repository may then be used to track statistics about that document. Then, in some embodiments of operation 306, the statistics may be analyzed as part of the evaluation of that document. This could include, for example, evaluating the document as being of a higher quality if it has a history of never crashing an ingestion pipeline or of taking less than a threshold amount of time on the average to annotate.

Per operation 308, document-annotator pair risk scores are generated for the document. In some embodiments, the document may be associated with a number of document-annotator pair risk scores that is equal to the number of annotators. Each such risk score may represent the likelihood that the document will fail to be successfully processed by a particular annotator of the primary ingestion pipeline. In some embodiments, the document-annotator pair risk scores may be generated based on the annotator risk sub-scores (e.g., the scores generated in the iterations of operation 303) and further based on the document risk sub-score (e.g., the score generated in operation 307). Different methods may be used for combining the applicable risk sub-scores. For example, in some embodiments, each document-annotator pair risk score may be generated by adding the applicable annotator risk sub-score to the applicable document risk sub-score. In some embodiments, the combining of the applicable risk sub-scores may be more complex. For example, if an annotator A has a high annotator risk sub-score because it is known to be unreliable when annotating medical documents and document B is a non-medical document that has a high document risk sub-score because it is known to create problems when processed by an annotator C, the example document-annotator pair risk score (e.g., B-A pair risk score) may be relatively low because the document B and annotator A, despite having high risk sub-scores individually, are not likely to cause problems together.

Per operation 309, a composite ingestion risk score (e.g., an ingestion risk score) is generated for the document. The composite ingestion risk score may be generated by combining each of the individual document-annotator pair risk scores for that document. In some embodiments, the individual document-annotator pair risk scores may be weighted differently from each other when generating the composite. Further, in some embodiments, not all of the applicable document-annotator pair risk scores may be considered. As generated, the composite ingestion risk score may represent the likelihood that the document will not successfully pass through the set of annotators in the primary ingestion pipeline.

Per operation 310, a determination is made as to whether the composite ingestion risk score satisfies a primary set of one or more criteria. In some embodiments, the primary set of criteria may include a plurality of parameters by which the composite ingestion risk score is measured. In some embodiments, the primary set of criteria may include a single risk threshold against which the composite ingestion risk score is compared. For example, if the composite risk score is below the risk threshold, the document may be deemed to satisfy the set of criteria. In some embodiments, a risk threshold may be adjustable based on the tolerance of the user of the document ingestion application. More specifically, if the user has low tolerance for document failure (e.g., cannot afford to have the primary ingestion pipeline crashed by a document) then the user may set a lower risk threshold than would otherwise be the case.

If it is determined in operation 310 that the composite ingestion risk score for the document satisfies the primary set of criteria, then, per operation 311, the document is entered into the primary ingestion pipeline for processing by the annotators therein. If, however, a determination is made in operation 310 that the composite ingestion risk score for the document does not satisfy the primary set of criteria, then, per operation 312, the document is entered into the secondary ingestion pipeline. In other embodiments, operation 312 may involve other forms of special handling for the document other than, or in addition to, entering the document into the secondary ingestion pipeline. Such special handling may include, for example, quarantining the document for later analysis.

Per operation 313, a determination is made as to whether there are any remaining documents to be ingested. If so, then each such remaining document may undergo operations 305 to 310 and then be entered, as applicable, into the primary ingestion pipeline (per operation 311) or the secondary ingestion pipeline (per operation 312). Once there are no more remaining documents to be ingested, the method 300 may end.

In one variant on the method 300, the ingestion risk scores may be determined on the aggregate (annotator grouping) level rather than on individual annotators. This may involve evaluating and generating risk sub-scores for aggregates rather than individual annotators.

Furthermore, in some embodiments, the intensity of debugging may not be the same for every annotator with a particular ingestion pipeline. For example, in the secondary ingestion pipeline, those annotators that have higher annotator risk sub-scores may have more intense debugging (e.g., heavier logging) than those annotators that have lower annotator risk sub-scores. Furthermore, in some embodiments, the intensity of debugging may also vary for an individual annotator based on the document that is being actively processed by that annotator. For example, when a document is being processed by an annotator and the document-annotator pair risk score is high, there may be more intensive debugging (e.g., longer timeouts) than would be the case with that same annotator and a different document.

Figure 4:
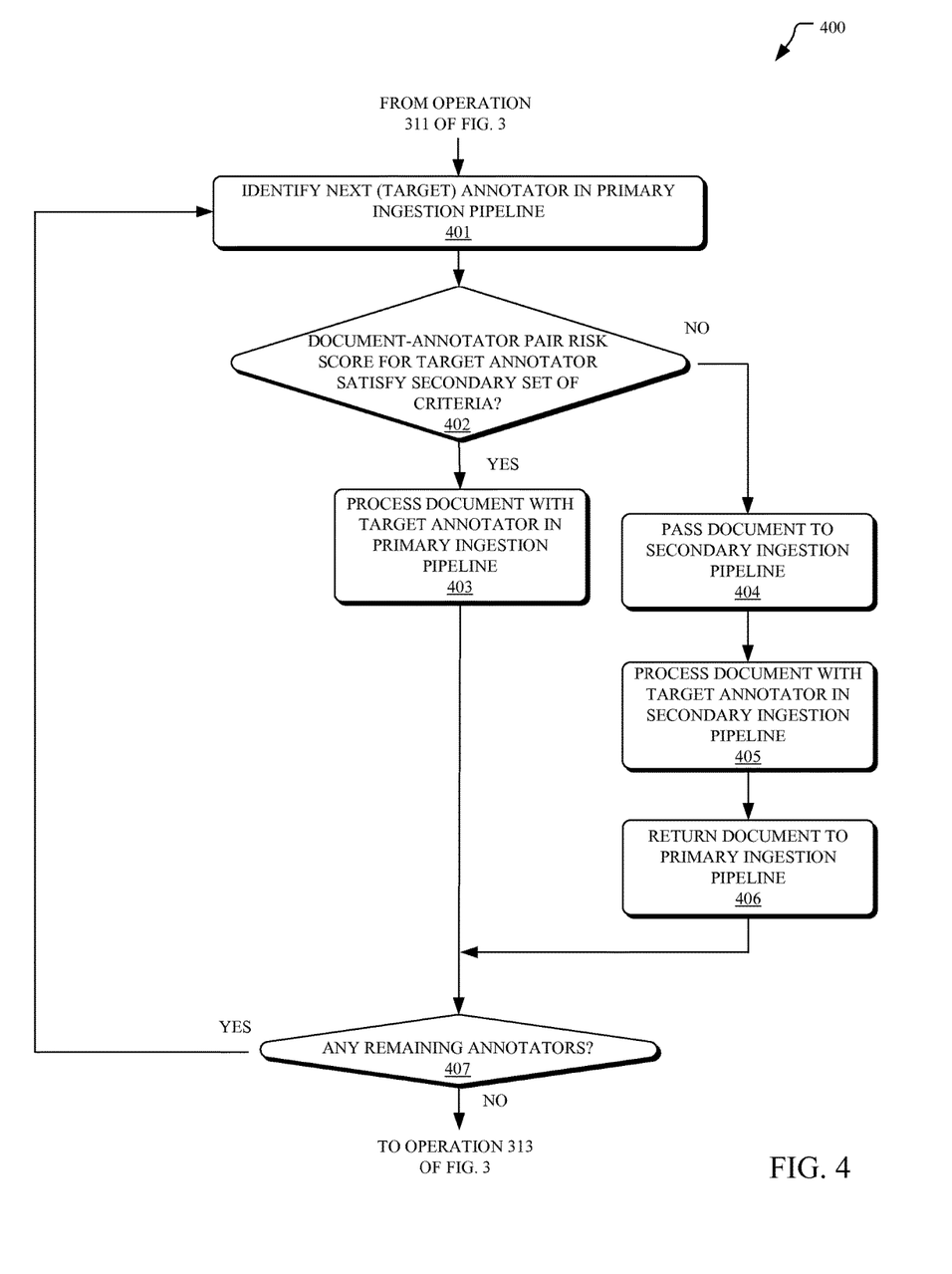
FIG. 4 illustrates a flowchart of an example method for transferring documents between a primary ingestion pipeline and a secondary ingestion pipeline in a natural language processing system, in accordance with embodiments of the present disclosure.

Referring now to FIG. 4, shown is a flowchart of an example method 400 for transferring documents between a primary ingestion pipeline and a secondary ingestion pipeline in a natural language processing system, in accordance with embodiments of the present disclosure. In some embodiments, one or more operations of the method 400 may be performed by the document ingestion application 240 of FIG. 2. Further, in some embodiments, the operations of method 400 may be used in addition to the operations of the method 300 of FIG. 3. In particular, method 400 may be performed between operations 311 and 313 of method 300 (e.g., the method 400 may be performed on documents that have been entered into the primary ingestion pipeline).

Per operation 401, a target annotator in the primary ingestion pipeline (e.g., the next annotator in line to process the document entered into the primary ingestion pipeline) is identified. Per operation 402, a determination is made as to whether the document-annotator pair risk score (for this particular document and the target annotator) satisfies a secondary set of criteria. In some embodiments, the secondary set of criteria may include a plurality of parameters by which the document-annotator pair risk score is measured. In some embodiments, the secondary set of criteria may include a single secondary risk threshold against which the document-annotator risk score is compared.

If, per operation 402, a determination is made that document-annotator pair risk score does not satisfy the secondary set of criteria (e.g., is above the secondary risk threshold), then, per operation 404, the document is passed (e.g., transferred) from the primary ingestion pipeline to the secondary ingestion pipeline. Per operation 405, the document is then processed by the target annotator in the secondary ingestion pipeline (e.g., a duplicate of the target annotator in the primary ingestion pipeline). Per operation 406, the document is returned to the primary ingestion pipeline.

An alternative path is followed if a determination is made in operation 402 that the document-annotator pair risk score does satisfy the secondary set of criteria. In such a case, the document is processed, per operation 403, by the target annotator in the primary ingestion pipeline.

Once operations 404 to 406 or operation 403 are completed, then, per operation 407, a determination is made as to whether there are any remaining annotators in the primary ingestion pipeline that have not processed the document. For each such annotator, operations 401, 402 and either 403 or 404 to 406 are completed, as applicable. Once the document has been processed by the entire set of annotators, then method 400 is complete. In some embodiments, upon the completion of the method 400, the method may return to operation 313 of method 300 and other documents may be processed.

Like method 300, method 400 may be performed partially or completely on a per aggregate level rather than a per individual annotator level. For example, document-aggregate pair risk scores may be used in place of document-annotator pair risk scores in evaluating which, if any, portion of the ingestion of a particular document should be performed in the secondary ingestion pipeline.

Figure 5:
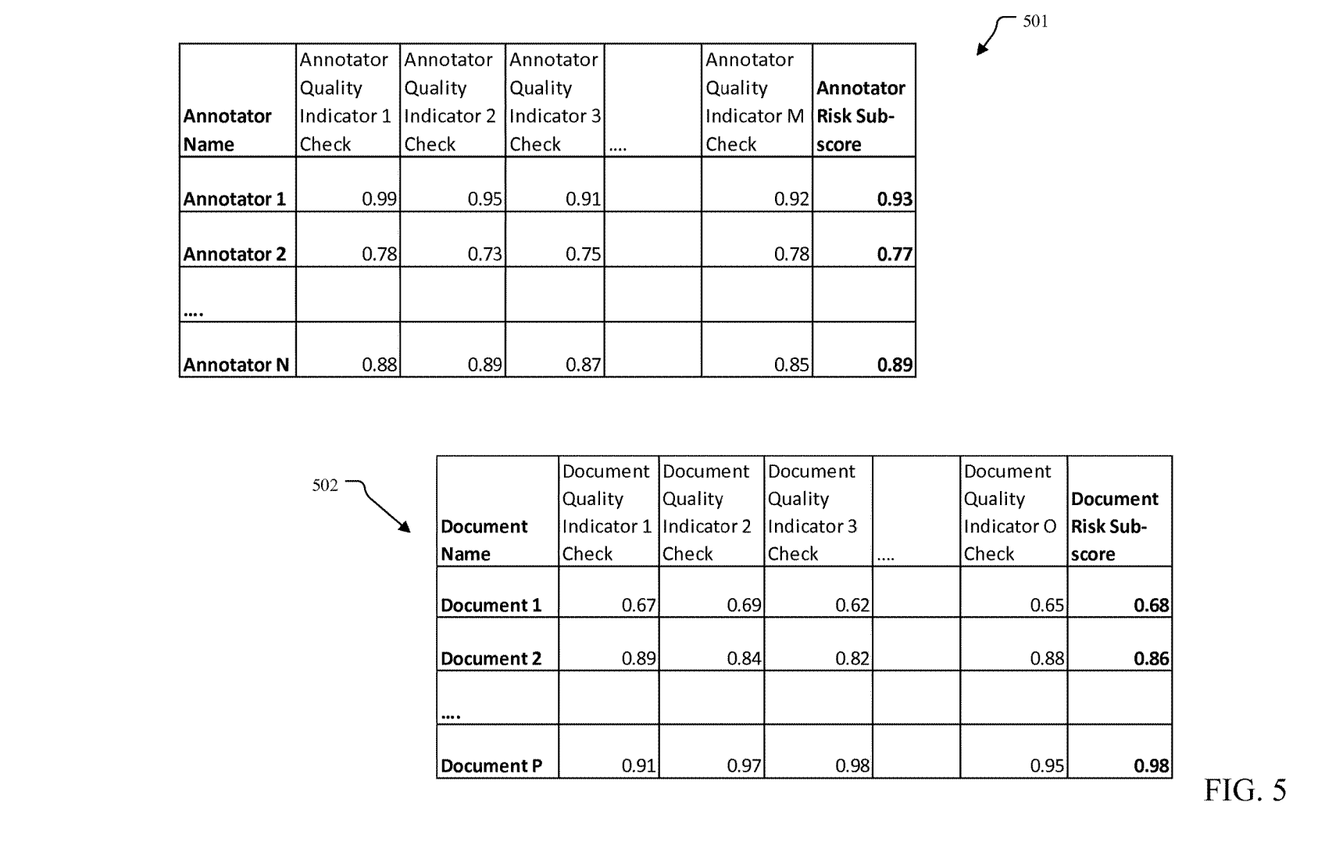
FIG. 5 illustrates a diagram of an example annotator evaluation chart and an example document evaluation chart, in accordance with embodiments of the present disclosure.

Referring now to FIG. 5, shown is an example annotator evaluation chart 501 and an example document evaluation chart 502, in accordance with embodiments of the present disclosure. As shown, the example annotator evaluation chart 501 includes annotator quality check scores for several indicators of annotator quality (e.g., annotator quality indicators 1 to M) for each of the annotators (e.g., annotators 1 to N) in a set of annotators included in an ingestion pipeline. The annotator evaluation chart 501 also includes an annotator risk sub-score for each annotator. In some embodiments, the annotator evaluation chart 501 may be generated through multiple iterations of operation 302 (evaluating annotators) and operation 303 (generating annotator risk sub-scores) described in method 300 of FIG. 3. In some embodiments, each annotator quality indicator 1 to M may be a specific indicator of the quality of annotators or a more generic indicator of the quality of executable code generally. Examples of annotator quality indicators may include complexity of the annotator's code (e.g., average "nested if" depth in code, average Boolean expression complexity in code, cyclomatic complexity of code) and failure rate of the annotator (or similar annotators) when used in prior document ingestions.

In some embodiments, the individual scores for each annotator as measured by each annotator quality indicator may be normalized. For instance, in the depicted example, the scores are normalized so that they range from 0.01 to 0.99, with higher numbers indicating a higher degree of quality. Further, in some embodiments, all of the individual annotator quality indicator scores for a particular annotator may be combined in some manner to yield an overall annotator risk sub-score for the annotator. For instance, in the depicted example, all of the annotator quality indicator scores for the annotator may be averaged to yield an annotator risk sub-score for each annotator 1 to N.

Also shown in FIG. 5 is the example document evaluation chart 502 that includes document quality check scores for several indicators of document quality (e.g., document quality indicators 1 to O) for each document (e.g., documents 1 to P) to be processed in the ingestion pipeline. The document evaluation chart 502 also includes a document risk sub-score for each document. In some embodiments, the document evaluation chart 502 may be generated through multiple iterations of operation 306 (evaluating documents) and operation 307 (generating document risk sub-scores) described in method 300 of FIG. 3. In some embodiments, each document quality indicator 1 to O may be a specific indicator of the quality of electronic documents or a more generic indicator of the quality of writing passages generally in terms of parsability or complexity. Examples of document quality indicators may include the type of formatting of the document (with some document types being easier to process), the average length of words in the document, the number of words in the document, and whether the document (or documents by the same author or publisher) has created problems with prior ingestions by other ingestion pipelines.

In some embodiments (such as the depicted example), the individual document quality indicator scores may be normalized. Further, in some embodiments and in the depicted example, all of the individual document quality indicator scores for a particular document may be combined in some manner to yield an overall document risk sub-score for the document.

To aid understanding, an example scenario employing some embodiments of operations of methods described herein is provided. In this scenario, a user determines that the documents 1 to P should be annotated by the set of annotators 1 to N. A document ingestion application is set up so that it includes a primary ingestion pipeline having a first set of the annotators 1 to N and also includes a secondary ingestion pipeline having a second, duplicate set of the annotators 1 to N. A risk analysis module then evaluates and scores each of the annotators 1 to N and thereby generates the annotator evaluation chart 501. The documents 1 to P are then input into the risk analysis module. The documents are evaluated and scored and the document evaluation chart 502 is generated.

A primary risk threshold is then set at 0.65 in this example. To calculate ingestion risk scores, in this example, the average of the annotator risk sub-scores is multiplied by the applicable document risk sub-score, with higher ingestion risk scores indicating a lower degree of risk. The average of the annotator risk sub-scores (not shown) is determined to be 0.90. For Document 1, the ingestion risk score is calculated to be 0.61 (i.e., 0.90*0.68). Because this is below the threshold of 0.65, Document 1 is entered into the secondary ingestion pipeline, processed by the set of annotators in the secondary ingestion pipeline, and then deposited in a corpus of annotated documents.

Next, for Document 2, the risk analysis module determines that the ingestion risk score is 0.77 (i.e., 0.90*0.86). Because this is above the threshold of 0.65, Document 2 is entered into the primary ingestion pipeline, processed by the set of annotators in the primary ingestion pipeline, and then deposited in the corpus of annotated documents.

The process continues for each of the remaining documents to be annotated. Once all of the documents have been annotated, a report may be generated based on logging in both the primary and secondary ingestion pipelines. The user may then utilize these reports to improve the quality of the annotators, so that they can work more efficiently in future ingestions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for analyzing a primary ingestion pipeline, the primary ingestion pipeline configured for using natural language processing (NLP) to populate a corpus with documents annotated with metadata tags such that the corpus becomes usable by a computer system for generating answers to questions as they are posed by users, the primary ingestion pipeline including a plurality of annotators configured for annotating documents passing through the primary ingestion pipeline, wherein each annotator of the plurality of annotators is configured to annotate the documents with a different defined subset of the metadata tags, the method comprising:
    evaluating the plurality of annotators;
    evaluating a plurality of documents to be annotated by the plurality of annotators;
    generating, based on the evaluating the plurality of annotators and further based on the evaluating the plurality of documents, an ingestion risk score for each document of the plurality of documents, wherein each ingestion risk score represents a likelihood that an associated document will not successfully be annotated by all of the plurality of annotators while passing sequentially through each annotator in the primary ingestion pipeline;
    comparing each ingestion risk score to a set of risk criteria;
    determining, based on the comparing, that each document of a first set of documents of the plurality of documents satisfies the set of risk criteria and that each document of a second set of documents of the plurality of documents does not satisfy the set of risk criteria;
    entering, in response to the determining, the first set of documents into the primary ingestion pipeline; and
    providing, in response to the determining, special handling to the second set of documents.

2. The method of claim 1, wherein the providing special handling includes entering the second set of documents in a secondary ingestion pipeline configured for use in NLP, the secondary ingestion pipeline including the plurality of annotators configured for annotating documents passing through the secondary ingestion pipeline.

3. The method of claim 2, wherein the primary ingestion pipeline has a first log level setting, and wherein the secondary ingestion pipeline has a second log level setting that is higher than the first log level setting, the method further comprising:
    logging, based on the first log level setting and while the first set of documents are passing through the primary ingestion pipeline, execution of program code of the plurality of annotators of the primary ingestion pipeline;
    logging, based on the second log level setting and while the second set of documents are passing through the secondary ingestion pipeline, execution of program code of the plurality of annotators of the secondary ingestion pipeline.

4. The method of claim 2 further comprising:
    annotating the first set of documents with the plurality of annotators in the primary ingestion pipeline; and
    annotating the second set of documents with the plurality of annotators in the secondary ingestion pipeline.

5. The method of claim 2 further comprising:
    generating, based on the evaluating the plurality of annotators and further based on the evaluating the plurality of documents, a document-annotator pair risk score for each document of the plurality of documents for each annotator of the plurality of annotators, wherein each document-annotator pair risk score represents a likelihood that an associated document will not successfully be annotated by an associated annotator while passing through the primary ingestion pipeline;

comparing each document-annotator pair risk score to a secondary set of risk criteria;

determining, based on the comparing each document-annotator pair risk score to the secondary set of risk criteria, that, for a first annotator of the plurality of annotators, a first document of the first set of documents does not satisfy the secondary set of risk criteria;

transferring, after entering the first document into the primary ingestion pipeline and in response to the secondary set of risk criteria failure determination, the first document from the primary ingestion pipeline to the secondary ingestion pipeline;

annotating the first document with the first annotator in the secondary ingestion pipeline; and transferring, after the annotating with the first annotator, the first document back to the primary ingestion pipeline.

6. The method of claim 5 further comprising:

annotating the first document in the primary ingestion pipeline with the plurality of annotators except for the first annotator.

7. The method of claim 1, wherein the set of risk criteria is a risk threshold.

8. A computer program for analyzing a primary ingestion pipeline configured for use in natural language processing (NLP), the primary ingestion pipeline including a plurality of annotators configured for annotating documents passing through the primary ingestion pipeline, the computer program product comprising a computer readable storage medium having program instructions embodied therewith, the program instructions executable by a computer to cause the computer to perform a method comprising:

evaluating the plurality of annotators;

evaluating a plurality of documents to be annotated by the plurality of annotators;

generating, based on the evaluating the plurality of annotators and further based on the evaluating the plurality of documents, an ingestion risk score for each document of the plurality of documents, wherein each ingestion risk score represents a likelihood that an associated document will not successfully be annotated by the plurality of annotators while passing through the primary ingestion pipeline;

comparing each ingestion risk score to a set of risk criteria;

determining, based on the comparing, that each document of a first set of documents of the plurality of documents satisfies the set of risk criteria and that each document of a second set of documents of the plurality of documents does not satisfy the set of risk criteria;

entering, in response to the determining, the first set of documents into the primary ingestion pipeline; and providing, in response to the determining, special handling to the second set of documents.

9. The computer program product of claim 8, wherein the providing special handling includes entering the second set of documents in a secondary ingestion pipeline configured for use in NLP, the secondary ingestion pipeline including the plurality of annotators configured for annotating documents passing through the secondary ingestion pipeline.

10. The computer program product of claim 9, wherein the primary ingestion pipeline has a first log level setting, wherein the secondary ingestion pipeline has a second log level setting that is higher than the first log level setting, and wherein the method further comprises:

logging, based on the first log level setting and while the first set of documents are passing through the primary ingestion pipeline, execution of program code of the plurality of annotators of the primary ingestion pipeline;

logging, based on the second log level setting and while the second set of documents are passing through the secondary ingestion pipeline, execution of program code of the plurality of annotators of the secondary ingestion pipeline.

11. The computer program product of claim 9, wherein the method further comprises:

annotating the first set of documents with the plurality of annotators in the primary ingestion pipeline; and annotating the second set of documents with the plurality of annotators in the secondary ingestion pipeline.

12. The computer program product of claim 9, wherein the method further comprises:

generating, based on the evaluating the plurality of annotators and further based on the evaluating the plurality of documents, a document-annotator pair risk score for each document of the plurality of documents for each annotator of the plurality of annotators, wherein each document-annotator pair risk score represents a likelihood that an associated document will not successfully be annotated by an associated annotator while passing through the primary ingestion pipeline;

comparing each document-annotator pair risk score to a secondary set of risk criteria;

determining, based on the comparing each document-annotator pair risk score to the secondary set of risk criteria, that, for a first annotator of the plurality of annotators, a first document of the first set of documents does not satisfy the secondary set of risk criteria;

transferring, after entering the first document into the primary ingestion pipeline and in response to the secondary set of risk criteria failure determination, the first document from the primary ingestion pipeline to the secondary ingestion pipeline;

annotating the first document with the first annotator in the secondary ingestion pipeline; and transferring, after the annotating with the first annotator, the first document back to the primary ingestion pipeline.

13. The computer program product of claim 12, wherein the method further comprises:

annotating the first document in the primary ingestion pipeline with the plurality of annotators except for the first annotator.

14. The computer program product of claim 8, wherein the set of risk criteria is a risk threshold.

15. A system for analyzing a primary ingestion pipeline configured for use in natural language processing (NLP), the primary ingestion pipeline including a plurality of annotators configured for annotating documents passing through the primary ingestion pipeline, the system comprising:

a memory;

at least one processor in communication with the memory, wherein the at least one processor is configured to perform a method comprising:

evaluating the plurality of annotators;

evaluating a plurality of documents to be annotated by the plurality of annotators;

generating, based on the evaluating the plurality of annotators and further based on the evaluating the plurality of documents, an ingestion risk score for each document of the plurality of documents, wherein each ingestion risk score represents a likelihood that an associated document will not successfully be annotated by the plurality of annotators while passing through the primary ingestion pipeline;

comparing each ingestion risk score to a set of risk criteria;

determining, based on the comparing, that each document of a first set of documents of the plurality of documents satisfies the set of risk criteria and that each document of a second set of documents of the plurality of documents does not satisfy the set of risk criteria;

entering, in response to the determining, the first set of documents into the primary ingestion pipeline; and providing, in response to the determining, special handling to the second set of documents.

16. The system of claim 15, wherein the providing special handling includes entering the second set of documents in a secondary ingestion pipeline configured for use in NLP, the secondary ingestion pipeline including the plurality of annotators configured for annotating documents passing through the secondary ingestion pipeline.

17. The system of claim 16, wherein the primary ingestion pipeline has a first log level setting, wherein the secondary ingestion pipeline has a second log level setting that is higher than the first log level setting, and wherein the method further comprises:

logging, based on the first log level setting and while the first set of documents are passing through the primary ingestion pipeline, execution of program code of the plurality of annotators of the primary ingestion pipeline;

logging, based on the second log level setting and while the second set of documents are passing through the secondary ingestion pipeline, execution of program code of the plurality of annotators of the secondary ingestion pipeline.

18. The system of claim 16, wherein the method further comprises:

annotating the first set of documents with the plurality of annotators in the primary ingestion pipeline; and annotating the second set of documents with the plurality of annotators in the secondary ingestion pipeline.

19. The system of claim 16, wherein the method further comprises:

generating, based on the evaluating the plurality of annotators and further based on the evaluating the plurality of documents, a document-annotator pair risk score for each document of the plurality of documents for each annotator of the plurality of annotators, wherein each document-annotator pair risk score represents a likelihood that an associated document will not successfully be annotated by an associated annotator while passing through the primary ingestion pipeline;

comparing each document-annotator pair risk score to a secondary set of risk criteria;

determining, based on the comparing each document-annotator pair risk score to the secondary set of risk criteria, that, for a first annotator of the plurality of annotators, a first document of the first set of documents does not satisfy the secondary set of risk criteria;

transferring, after entering the first document into the primary ingestion pipeline and in response to the secondary set of risk criteria failure determination, the first document from the primary ingestion pipeline to the secondary ingestion pipeline;

annotating the first document with the first annotator in the secondary ingestion pipeline; and transferring, after the annotating with the first annotator, the first document back to the primary ingestion pipeline.

20. The system of claim 19, wherein the method further comprises:

annotating the first document in the primary ingestion pipeline with the plurality of annotators except for the first annotator.

* * * * *